(12) United States Patent
Hirano et al.

(10) Patent No.: US 6,352,653 B1
(45) Date of Patent: Mar. 5, 2002

(54) ACID COMPONENT-REMOVING AGENT, METHOD FOR PRODUCING IT AND METHOD FOR REMOVING ACID COMPONENTS

(75) Inventors: Hachiro Hirano, Ichihara; Makoto Yoshida, Kitakyusyu; Hiroaki Noda, Ichihara; Shigeru Sakurai, Kitakyusyu; Makoto Kusaka; Masaharu Tanaka, both of Ichihara, all of (JP)

(73) Assignee: Asahi Glass Company Ltd., Tokyo (JP)

( * ) Notice: Subject to any disclaimer, the term of this patent is extended or adjusted under 35 U.S.C. 154(b) by 0 days.

(21) Appl. No.: 09/448,443

(22) Filed: Nov. 24, 1999

(30) Foreign Application Priority Data

Nov. 26, 1998 (JP) .............................. 10-335839
Sep. 9, 1999 (JP) .............................. 11-256271

(51) Int. Cl.[7] .............................. C09K 3/00; C01D 7/00; C01D 7/12; C01D 7/38
(52) U.S. Cl. ...................... 252/189; 423/421; 423/422
(58) Field of Search ................................ 252/189, 192; 423/421, 422

(56) References Cited

U.S. PATENT DOCUMENTS 3,880,629 A    1/1975  Dulin et al.
3,868,444 A *  2/1975  Frevel et al. ................ 423/422
3,870,784 A *  3/1975  Saeman ....................... 423/422
3,944,500 A *  3/1976  Gancy et al. .............. 252/182.1
4,018,868 A *  4/1977  Knight ........................ 423/244
5,084,258 A    1/1992  Lin
5,316,587 A *  5/1994  Yam et al. ....................... 134/7
5,411,750 A *  5/1995  Lajoie et al. ................. 424/717
5,424,077 A    6/1995  Lajoie ......................... 424/641
5,482,701 A    1/1996  Winston ....................... 424/65
5,482,720 A *  1/1996  Murphy et al. .............. 424/489
4,600,570 A    7/1996  Lin
5,628,990 A *  5/1997  Murphy et al. ............... 424/65
5,800,805 A *  9/1998  Salas ........................... 424/65

FOREIGN PATENT DOCUMENTS

DE      196 21 492        2/1997
EP      0245652 A2       11/1987
WO      WO 95/19835       7/1995
WO      WO 98/51400      11/1998

* cited by examiner

*Primary Examiner*—Joseph D. Anthony
(74) *Attorney, Agent, or Firm*—Oblon, Spivak, McClelland, Maier & Neustadt, P.C.

(57) ABSTRACT

An acid component-removing agent which comprises sodium hydrogencarbonate having a volume-based mean particle diameter of from 1 to 9 μm as measured by a laser diffraction and scattering method.

18 Claims, 1 Drawing Sheet

FIG. 1

ACID COMPONENT-REMOVING AGENT, METHOD FOR PRODUCING IT AND METHOD FOR REMOVING ACID COMPONENTS

The present invention relates to an acid component-removing agent for a gas, a method for producing it and method for removing acid components from a gas.

It has been known to use slaked lime as an acid component-removing agent, to absorb and remove hydrogen chloride or a sulfur oxide in an exhaust gas discharged from e.g. a refuse incinerator. In such a case, slaked lime is dispersed in an exhaust gas discharge path from the incinerator at a region having temperatures of from 150 to 300° C., followed by collection by a bag filter or an electrical dust collector, whereby acid components are removed.

However, it is necessary to use slaked lime in an excessive amount of from 3 to 4 equivalent amount to reaction equivalent, whereby the amount of dust to be wasted will increase. Further, the dust is solidified by means of concrete, and the solidified dust is accounting for the dumping site for final disposal. The reaction product of hydrogen chloride and slaked lime is a calcium chloride which is water-soluble, whereby the reaction product can be removed by dissolving in water. However, some of slaked lime excessively added will form quick lime which is water-insoluble, and accordingly only a small amount of effects of reducing dust by water will be obtainable. Further, calcium scales will form during treatment of an aqueous calcium chloride solution at the final disposal site, thus causing troubles.

Further, it has been known to use sodium hydrogencarbonate as the acid component-removing agent instead of slaked lime. In such a case, unreacted sodium hydrogencarbonate will form sodium carbonate which is water-soluble, and accordingly it is effective to reduce dust. For example, EP0740577 discloses an acid component-removing agent comprising a composition containing sodium hydrogencarbonate in an amount exceeding 98 wt % and sodium carbonate in an amount of less than 2 wt %. It is disclosed that the mean particle diameter of the composition is at most 50 $\mu$m, preferably from 10 to 30 $\mu$m.

However, sodium hydrogencarbonate is expensive as compared with slaked lime, and it has thereby been desired to supply sodium hydrogencarbonate which has a high reactivity and presents effects with a small amount, with an industrial scale at a low cost. Further, it is desirable that the acid component-removing agent can be used without installation of a dust arrestor, it can be easily and stably injected to a gas to be treated, it can be well dispersed in the gas, the reaction rate is high, and a long-term preservation in a storage tank or a stock room at the operation site is possible.

Further, sulfur trioxide contained in an exhaust gas produced e.g. during operation of a boiler with fuel containing a sulfur content, will react with water vapor contained in the exhaust gas to form a sulfuric acid mist, which will form white smoke, violet smoke or white fume when discharged in the air, and will cause air pollution. Accordingly, in order to remove the sulfur trioxide component, it has been employed to preliminarily add a slurry having e.g. an oxide or hydroxide of calcium or magnesium dispersed in an organic solvent to the fuel, for prevention of sulfur trioxide formation, or to neutralize sulfur trioxide after combustion. However, with such methods, the additions are likely to deposit on a heat exchanger in the boiler, and when a large amount of the additives deposit thereon, the operation of the boiler will be hindered, and accordingly it is hard to use a large amount of the additives.

Further, to actively remove sulfur trioxide in a flue, it has been employed to inject a powder of the above-mentioned oxide or hydroxide or a slurry thereof, to the flue after the exhaust gas has passed through an air preheater. However, in the case where the powder itself is injected by this method, as a fine powder having a poor fluidity is discharged from the storage tank, and the powder is injected by means of e.g. a screw feeder as a positive-displacement powder transportation apparatus, quantitativeness will be poor, and no stable effect is likely to be obtainable. Further, in the case of injecting the slurry, the powder contained in the slurry is likely to deposit on and clog the transportation line for injecting the slurry, whereby the method can hardly be carried out stably.

As the acid component-removing agent for e.g. a refuse incineration plant, slaked lime has conventionally been used. Although slaked lime can be available at a low cost, there are problems in view of waste disposal, such as increase in water-insoluble dust to be wasted, or generation of calcium scales in the seepage water at the final disposal site. Further, in the case of using sodium hydrogencarbonate, as it is expensive, it is necessary to increase the reaction efficiency and to reduce the amount to be used. Further, when the amount to be used can be reduced, an equipped apparatus can be downsized, and the dust to be treated can be reduced.

On the other hand, in the case of using e.g. magnesium oxide to remove acid components in a boiler exhaust gas, such as sulfur trioxide or a sulfuric acid mist based on sulfur trioxide (hereinafter they will generically be referred to as $SO_3$ component), since magnesium oxide also has a low reaction efficiency, it is necessary to add an excessive amount of magnesium oxide. In such a case, unreacted magnesium oxide will remain in the flue, and may cause problems in post-treatment, since magnesium oxide has a low solubility in water. Further, it is difficult to quantify the injection amount of the powder, and accordingly it has been desired to develop an acid component-removing agent which can be sprayed on the flue stably and quantitatively.

Under these circumstances, it is an object of the present invention to industrially provide an acid component-removing agent which can effectively remove acid components such as hydrogen chloride, sulfur oxide such as $SO_3$, nitrogen oxide or hydrogen fluoride from an exhaust gas, with which waste disposal can easily be carried out, and which can reduce the amount of waste.

The present invention provides an acid component-removing agent which comprises sodium hydrogencarbonate having a volume-based mean particle diameter of from 1 to 9 $\mu$m as measured by a laser diffraction and scattering method, and a method for producing it.

Of the acid component-removing agent of the present invention, the mean particle diameter of the sodium hydrogencarbonate is represented by the value of the volume-based mean particle diameter as measured by using a laser diffraction and scattering particle size analyzer. Hereinafter the mean particle diameter will be represented by the value as measured by this method, unless otherwise specified. In the present specification, the mean particle diameter is measured by using Microtrack FRA9220 manufactured by NIKKISO CO., LTD. For a supplementary examination, a volume-based mean particle diameter means the same as a mass-based mean particle diameter, because sodium hydrogencarbonate has a homogeneous density.

The acid component-removing agent of the present invention reacts with acid components present in a gas, and removes the acid components from said gas. The acid components to be removed are not particularly limited, and the acid component-removing agent of the present invention can be applied to various acid components such as hydrogen chloride, sulfur dioxide, sulfur trioxide, hydrogen fluoride and nitrogen oxides. Particularly when the acid component-removing agent of the present invention is applied to a compound containing chlorine such as hydrogen chloride, or to a $SO_3$ component, the reaction efficiency is high, and it is easy to handle it, as compared with a conventional one. Now, the present invention will be explained with reference to hydrogen chloride. However, the same applies to the other acid components.

By using sodium hydrogencarbonate, when sodium hydrogencarbonate particles are converted to sodium carbonate by calcination, the particles become porous, and effectively react with hydrogen chloride, whereby hydrogen chloride can effectively be removed. The present inventors have measured and observed the particle sizes, pore distributions and shapes of sodium hydrogencarbonate and sodium carbonate before and after calcination in detail, and they have found that the reaction characteristics of the porous structure obtained when the particles become porous, with hydrogen chloride, are sensitively affected by the average particle size of the sodium hydrogencarbonate, and the present invention has been accomplished.

In the acid component-removing agent of the present invention, the mean particle diameter of the sodium hydrogencarbonate is within a range of from 1 to 9 $\mu$m. If the mean particle diameter of the sodium hydrogencarbonate exceeds 9 $\mu$m, when the sodium hydrogencarbonate is calcinated to form sodium carbonate, spongy sodium carbonate particles having fine pores with diameters of at most several tens nm, while maintaining the profile of the outer surface of the sodium hydrogencarbonate, will be obtained. On the other hand, if the mean particle diameter of the sodium hydrogencarbonate is at most 9 $\mu$m, pores having relatively large diameters to the particle sizes will be formed, and accordingly the surfaces of the particles are significantly rugged, and irregular profiles will be obtained.

The feature of the present invention resides in such a fact that sodium hydrogencarbonate having a mean particle diameter of at most 9 $\mu$m is calcinated to produce sodium carbonate, the above-mentioned special pore structure can be obtained, and said pore structure is extremely effective for absorption of an acid gas. In the prior art, although an example for absorption of an acid gas by sodium hydrogencarbonate having a large particle size has been disclosed, sodium hydrogencarbonate having a mean particle diameter of at most 9 $\mu$m has not been employed, and it has not been known that the pore structure and the particle shape of the sodium carbonate after calcination change when the particle size of the sodium hydrogencarbonate is made small.

The present inventors have estimated that when the particles are scattered in the air current, or when the particles are trapped by a bag filter to form a particle deposit bed, and gases of the acid components such as hydrogen chloride pass through the particles, diffusion of the acid components into the surfaces of particles and the reaction between the acid components with the particles are likely to take place by the above-mentioned shape, whereby a good reaction with the acid components can be accelerated. The mean particle diameter of the sodium hydrogencarbonate is more preferably at most 8 $\mu$m.

The lower limit of the mean particle diameter of the sodium hydrogencarbonate is not particularly limited in view of reactivity with the acid components. However, if the mean particle diameter is less than 1 $\mu$m, the particles tend to adhere to one another, and no adequate fluidity may be maintained even if an anti-caking agent as mentioned hereinafter is used together, or it may be necessary to add a large amount of the anti-caking agent. Further, for industrial production, costs for operation and equipments required for grinding may be excessive.

The sodium hydrogencarbonate in the acid component-removing agent of the present invention, has a pore distribution in its powder bed as measured by a mercury penetration method, wherein the volume of pores having pore diameters within a range of from 1 to 10 $\mu$m is preferably at least 0.4 cm$^3$/g. In the present specification, the pore distribution in the powder bed as measured by a mercury penetration method, is represented by the value as measured by a mercury penetration method with respect to the powder bed of the sodium hydrogencarbonate. Specifically, measurement is carried out with respect to a powder bed filled by lightly shaking off 0.25 g of the powder from a spatula in a cylindrical cell with a diameter of 15 mm and a height of 30 mm. Hereinafter the volume of pores will be represented by the value as measured by this method, unless otherwise specified.

Further, the sodium hydrogencarbonate in the acid component-removing agent of the present invention is preferably such that when it is calcinated at 200° C. for 1 hour, the resulting sodium carbonate has the same powder characteristics as the sodium hydrogencarbonate. Namely, the obtained sodium carbonate has a pore distribution in its powder bed as measured by a mercury penetration method, wherein the volume of pores having pore diameters within a range of from 1 to 10 $\mu$m is preferably at least 0.4 cm$^3$/g.

The calcination operation to convert the sodium hydrogencarbonate into sodium carbonate is carried out in such a manner that 5 g of the sodium hydrogencarbonate is thinly scattered on a laboratory dish with a diameter of 60 mm, preliminarily heated to about 200° C., which is then left in a hot-air circulation drier maintained at 200° C., and the laboratory dish was taken out after 1 hour.

When the volume of pores of the sodium hydrogencarbonate and the sodium carbonate having pore diameters within a range of from 1 to 10 $\mu$m, is within the above-specified range, a high effect for removing the acid components can be obtained. Although the mechanism of appearance of the effect has not been clearly understood, it is considered that easiness in diffusion of the acid components in the acid component-removing agent is correlated with the volume of pores having pore diameters within a range of from 1 to 10 $\mu$m. Namely, it is considered that in the acid component-removing agent of the present invention, as the mean particle diameter of the sodium hydrogencarbonate is at most 9 $\mu$m, when the sodium hydrogencarbonate is converted to sodium carbonate, pores having large diameters of at least 1 $\mu$m are likely to be formed, whereby the particles will significantly be rugged, and will present irregular profiles, and accordingly diffusion of the gas will easily take place.

If the mean particle diameter of the sodium hydrogencarbonate exceeds 9 $\mu$m, in the resulting sodium carbonate, pores having diameters of at least 1 $\mu$m will not form, or will form but in a small ratio. For example, when sodium hydrogencarbonate having a mean particle diameter of 83 $\mu$m is calcinated at 200° C. for 1 hour, the resulting sodium carbonate has a volume of pores having pore diameters of from 0.1 to 1.0 $\mu$m of 0.30 cm$^3$/g, and a volume of pores having pore diameters of from 1.0 to 10 $\mu$m of 0.04 cm$^3$/g. Further, when sodium hydrogencarbonate having a mean particle diameter of 21 $\mu$m is calcinated at 200° C. for 1 hour, the resulting sodium carbonate has a volume of pores having pore diameters of from 0.1 to 1.0 μm of 0.28 cm³/g, and a volume of pores having pore diameters of from 1.0 to 10 μm of 0.24 cm³/g.

Namely, most of pores have pore diameters of from 0.1 to 1.0 μm, and the shape is such that the particles have relatively fine pores. Accordingly, the acid components are required to diffuse in a fine and long path, whereby diffusion of the acid components will take long, such being disadvantageous to the reaction. On the other hand, volume of pores having pore diameters of from 1.0 to 10 μm, which are considered to be effective to remove the acid components in a short period of time, is less than 0.4 cm³/g, and accordingly performances for absorption of the acid components tends to be poor.

When sodium hydrogencarbonate is calcinated at a temperature of at least 100° C., it is converted into sodium carbonate. For example, with respect to sodium hydrogencarbonate and the resulting sodium carbonate obtained by calcinating the sodium hydrogencarbonate at 200° C. for 1 hour, no significant change in the average particle size is observed before and after the calcination. Specifically, with respect to the sodium hydrogencarbonate having a mean particle diameter within a range of from 0.7 to 50 μm, as observed by the present inventors, it has been confirmed that the average particle size does not significantly change before and after the calcination.

The difference in true volume between sodium hydrogencarbonate (molecular weight: 84.01, density: 2.19 g/cm³) and sodium carbonate (molecular weight: 105.99, density: 2.53 g/cm³) obtainable from said sodium hydrogencarbonate, is 0.33 cm³/g based on the weight of the sodium carbonate. Namely, when the sodium hydrogencarbonate is converted to sodium carbonate while maintaining the outer shape, the volume of pores of the sodium carbonate is 0.33 cm³/g. When the sodium carbonate reacts with hydrogen chloride to form sodium chloride (molecular weight: 58.44, density: 2.161 g/cm³), the true volume will slightly increase, whereby the volume of pores will decrease. However, a volume of pores of 0.19 cm³/g still remains according to calculation. This is one reason why sodium hydrogencarbonate has a high reactivity as compared with a calcium type acid component-removing agent such as slaked lime, and is essentially advantageous.

With respect to a conventional calcium type acid component-removing agent, the acid component-removing agent excessively used during the process for treating the acid components, will produce water-insoluble calcium salts in addition to calcium chloride, which will produce solid waste. On the other hand, with respect to the acid component-removing agent of the present invention, the product in the process for treating the acid components is, for example, mainly sodium chloride and sodium carbonate in the case of hydrogen chloride. Accordingly, when they are separated from ash of e.g. other heavy metals, they can be dissolved in water and treated, whereby the amount of solid waste can be reduced. Although a potassium type acid component-removing agent is also advantageous in this point, the potassium type acid component-removing agent has a high moisture absorption. Further, also in view of price for purchase, it is more advantageous to employ sodium hydrogencarbonate.

In the accompanying drawing.

Now, the present invention will be described in detail with reference to the preferred embodiments.

The acid component-removing agent of the present invention can be produced, for example, by grinding sodium hydrogencarbonate having a mean particle diameter of at least 50 μm to have a mean particle diameter of at most 9 μm. The grinding method may be either of dry grinding or wet grinding.

In the case of dry grinding, it is preferred to use e.g. an impact type grinder (a grinder by means of e.g. a blade rotating at a high speed), a jet mill (a grinder by means of an impact air current) or a ball mill. It is more preferred to grind the sodium hydrogencarbonate by means of an impact type grinder equipped with an air classifier, to classify particles discharged from the grinder, and to return large particles to the grinder, since the sodium hydrogencarbonate having a desired particle size can be obtained with a high yield. Further, it is also preferred to use a jet mill, as it is suitable for grinding to obtain fine particles, and the sodium hydrogencarbonate having a desired particle size can be obtained with a high yield, without removing large particles by sieving.

In the case of wet grinding, it is preferred to use e.g. an agitator bead mill or a ball mill. It is particularly preferred to disperse sodium hydrogencarbonate in a liquid which dissolves substantially no sodium hydrogencarbonate and which will not be denaturalized to obtain a slurry, to subject said slurry to wet grinding by an agitator bead mill or a ball mill, and to separate the resulting sodium hydrogencarbonate, followed by drying, since sodium hydrogencarbonate having a small average particle size can be obtained. As the liquid dissolving substantially no sodium hydrogencarbonate, a liquid which will not be denaturalized by alkalinity of the sodium hydrogencarbonate, and which has a low viscosity, is preferred.

Such a liquid may, for example, be methanol, ethanol, acetone or $C_4F_9OCH_3$. The liquid dissolving substantially no sodium hydrogencarbonate is preferably one having a solubility of the sodium hydrogencarbonate of at most 3% by mass, more preferably one having a solubility of at most 1% by mass.

The acid component-removing agent of the present invention may contain, in addition to the sodium hydrogencarbonate having a mean particle diameter of from 1 to 9 μm, another acid component-removing component such as potassium hydrogencarbonate, slaked lime, calcium carbonate or zeolite, an adsorbent such as activated carbon, or an anti-caking agent such as silica or diatomaceous earth. The sodium hydrogencarbonate having a mean particle diameter of from 1 to 9 μm is contained in an amount of preferably at least 70% by mass in the acid component-removing agent.

The acid component-removing agent of the present invention will coagulate when preserved for a long period of time, since sodium hydrogencarbonate having a small particle size is used for it as compared with a conventional one. Although the acid component-removing agent of the present invention can be directly supplied to a gas to be treated from a storage tank, there are possible fears that when the sodium hydrogencarbonate coagulates, fluidity as a powder tends to decrease, and discharge from the storage tank will deteriorate, or dispersion in a flue will deteriorate, whereby reactivity with the acid components will decrease. Accordingly, it is preferred to add an anti-caking agent to the acid component-removing agent. By the addition of the anti-caking agent, fluidity will be maintained, and storage of the acid component-removing agent in the storage tank can be made possible.

As the anti-caking agent, preferred is a silica powder such as fumed silica or white carbon, a basic magnesium carbonate, calcium carbonate or diatomaceous earth. Particularly preferred is a fine silicic anhydride called fumed silica, since effects can be obtained with a small amount. The content of the anti-caking agent is preferably from 0.1 to 5% by mass, particularly preferably from 0.3 to 2% by mass, based on the total amount of the acid component-removing agent including the anti-caking agent, although the optimum amount depends on the degree of grinding or storage conditions of the sodium hydrogencarbonate.

As the fumed silica, one having a hydrophobic treatment applied thereto, and a hydrophilic one having no hydrophobic treatment applied thereto, are available. When a hydrophobic silica having a hydrophobic treatment applied thereto, is used, although fluidity of the acid component-removing agent in the gas will improve, a small amount of the acid component-removing agent will float on water when dissolved in water after the treatment of the acid components. Accordingly, it is preferred to employ a hydrophilic fumed silica for e.g. treatment of an exhaust gas in a boiler equipped with a wet exhaust gas treatment apparatus.

Further, to prevent coagulation of the acid component-removing agent of the present invention, in addition to the above-mentioned methods, a method of adding from 10 to 30% by mass of sodium hydrogencarbonate having a mean particle diameter of at least 50 $\mu$m, may be mentioned. The acid component-removing agent obtainable by this method preferably contains sodium hydrogencarbonate having two peaks within ranges of from 1 to 9 $\mu$m and from 50 to 200 $\mu$m in a volume-based mean particle diameter distribution as measured by a laser diffraction and scattering particle size analyzer, and having sodium hydrogencarbonate having particle sizes exceeding 44 $\mu$m in an amount of from 10 to 30 wt % based on the total amount. Instead of measuring the amount of exceeding 44 $\mu$m by a laser diffraction and scattering particle size analyzer, an amount of large size particle can be measured by a sieving method based mass percentage. Because of the crystal of sodium hydrogencarbonate is not porous or hollow, the mass percentage is able to regard the same value with the volume percentage. In concrete an amount of exceeding 45 $\mu$m is measured by a sieving method employing a sieve which mesh size is 45 $\mu$m. When this sieving method is employed, the acid component-removing agent of the present invention is the content of sodium hydrogencarbonate which particle size is exceeding 45 $\mu$m is preferably from 10 to 30% by mass based on the acid component-removing agent, and it is preferable the size distribution frequency curve of this acid component-removing agent, measured by a laser diffraction and scattering particle size analyzer, has two peaks, one is in the range from 1 to 9 $\mu$m and another is the range from 50 to 200 $\mu$m.

The content of the sodium hydrogencarbonate having a mean particle diameter of from 50 to 200 $\mu$m is preferably from 10 to 30% by mass based on the acid component-removing agent. The content of the sodium hydrogencarbonate having a mean particle diameter of from 50 to 200 $\mu$m is less than 10% by mass, no substantial effect for improving fluidity can be obtainable. If the content of the sodium hydrogencarbonate having a mean particle diameter of from 50 to 200 $\mu$m exceeds 30% by mass, efficiency for removing the acid components may deteriorate.

In the case where sodium hydrogencarbonate having such a large mean particle diameter is added, the acid component-removing agent itself (the sodium hydrogencarbonate having a mean particle diameter of from 1 to 9 $\mu$m and the sodium hydrogencarbonate having a mean particle diameter of from 50 to 200 $\mu$m) or a reaction product thereof with acid gasses will dissolve in water. Accordingly, a water-insoluble content after treatment of the acid components can be reduced, and generation of dust due to the anti-caking agent in a form of fine powders can be suppressed, as compared with a case of using an anti-caking agent having a low solubility in water, such as a silica powder, a basic magnesium carbonate, calcium carbonate or diatomaceous earth. Further, the sodium hydrogencarbonate having a mean particle diameter of at least 50 $\mu$m can be used together with the anti-caking agent such as fumed silica. In such a case, the content of the anti-caking agent is preferably from 0.1 to 5% by mass based on the total amount of the acid component-removing agent including the anti-caking agent and the sodium hydrogencarbonate having a mean particle diameter of from 50 to 200 $\mu$m. In such a case, the addition amount of the anti-caking agent can be reduced as compared with a case of adding no sodium hydrogencarbonate having a mean particle diameter of from 50 to 200 $\mu$m.

The gas containing the acid components which can be treated by the acid component-removing agent of the present invention, may, for example, be an exhaust gas containing hydrogen chloride or hydrogen fluoride from e.g. an incinerator for industrial waste, city waste or medical waste such as polyvinyl chloride, an exhaust gas containing sulfur oxides, particularly sulfur trioxide, from e.g. a boiler in a power station using fuel containing a sulfur content such as fossil fuel, a combustion gas containing nitrogen oxides, or a gas having acid components mixed therewith as impurities in the production process for a product.

As the method to remove the acid components in the gas by using the acid component-removing agent of the present invention, preferred is a method to disperse the acid component-removing agent of the present invention in the gas containing the acid components, followed by collection by a bag filter. In this method, a filter layer of the acid component-removing agent will be formed on the surface of the bag filter, whereby the acid components can be effectively removed. Although the temperature of the gas containing the acid components is preferably higher than the acid dew point, the temperature is preferably low in view of suppression of dioxin formation. Specifically, it is preferably from 100 to 200° C.

Figure 1:
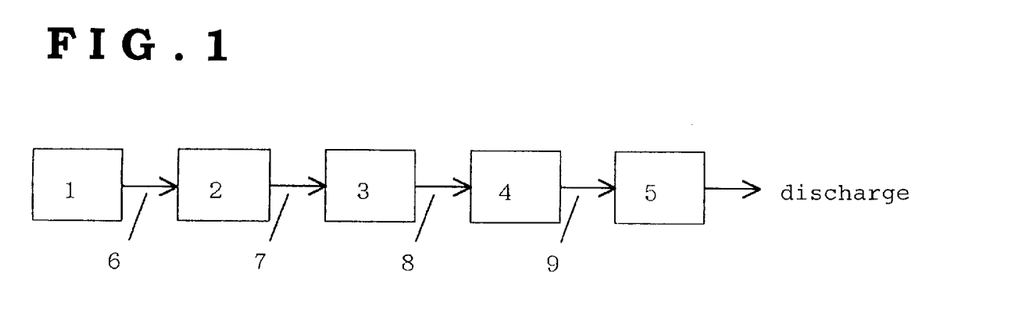
FIG. 1 is a flowchart illustrating a conventional method for treating an exhaust gas obtained by combustion in a boiler.

Now, another specific method to remove the acid components in a gas by using the acid component-removing agent of the present invention, will be explained with reference to a method of treating sulfur oxides, particularly the $SO_3$ component, in an exhaust gas produced by combustion of fuel containing a sulfur content in a boiler, with reference to FIG. 1. FIG. 1 is a flowchart illustrating a conventional method for treating an exhaust gas obtained by combustion in a boiler.

An exhaust gas having a high temperature, incinerated in a boiler 1, is transported to an air preheater 2 through a first flue 6, and subjected to heat exchange with an air for combustion transported to the boiler 1. Then, the exhaust gas is transported to an electrical dust collector 3 through a second flue 7, and dust contained in the exhaust gas is removed by static electricity. The electrical dust collector 3 may not be used depending upon the components contained in the exhaust gas. The exhaust gas passed through the electrical dust collector is transported to a desulfurizer 4 through a third flue 8, and e.g. $SO_2$ is removed by e.g. a magnesium hydroxide slurry. Then, the exhaust gas is transported to a smokestack 5 through a fourth flue 9, and discharged from the smokestack 5.

When the exhaust gas is discharged as mentioned above, such a phenomenon that a long streamer of white smoke or violet smoke is rising from the smokestack 5, may appear. It is considered that this is caused mainly by a sulfuric acid mist formed by reaction of $SO_3$ contained in the exhaust gas with water vapor contained in the atmosphere or the flue gas in the flues or the desulfurizer 4. Accordingly, generation of white smoke or violet smoke can be prevented by adding the acid component-removing agent of the present invention to the exhaust gas, for removal of $SO_3$ and the sulfuric acid mist.

In the above-mentioned process, the sodium hydrogencarbonate powder is added to at least one of the four flues, and the flue to which the powder is added, is optionally selected depending upon the purpose. To remove the $SO_3$ component, it is preferred to add the acid component-removing agent to a flue before the desulfurizer, and it is particularly preferred to add the agent to the third flue 8. The gas in the flue is preferably maintained to at least 60° C.

Further, by adding the acid component-removing agent to the second flue 7 between the air preheater 2 and the electrical dust collector 3, acid dust fall can be suppressed, charge failure of the electrical dust collector 3 can be suppressed, and ammonia can be reduced. In the case of suppressing the acid dust fall, it is preferred to add the acid component-removing agent in an amount of from 1 to 10% by mass to the amount of dust.

In the case of removing the $SO_3$ component from the above-mentioned exhaust gas, the sodium hydrogencarbonate powder is added in an amount of preferably from 0.5 to 5 equivalent amount, particularly preferably from 2 to 4 equivalent amount, to the $SO_3$ component contained in the gas. If it is less than 0.5 equivalent amount, the $SO_3$ component can not adequately be removed. However, the sodium hydrogencarbonate in the present invention has a high reaction efficiency as compared with e.g. magnesium hydroxide, and accordingly about 5 equivalent amount of the sodium hydrogencarbonate can almost completely remove the $SO_3$ component.

Further, for such a process, it is effective to add the anti-caking agent, to smoothly carry out discharge of the sodium hydrogencarbonate from the storage tank, to quantitatively supply the acid component-removing agent to the flue, and to smoothly disperse the sodium hydrogencarbonate in the flue. Particularly the presence of the anti-caking agent can suppress coagulation of the sodium hydrogencarbonate, whereby the sodium hydrogencarbonate can be well dispersed in the gas. As a result, a high reaction efficiency can be maintained.

In such a case, the anti-caking agent is preferably fine particles having a mean particle diameter of from 0.005 to 0.1 μm. When the fine particles having such an average particle size range are added as the anti-caking agent, said fine particles adhere to the surface of the sodium hydrogencarbonate particles, whereby coagulation of the sodium hydrogencarbonate particles to other particles can be prevented.

Further, as mentioned above, silica is preferred as the anti-caking agent contained in the acid component-removing agent, and in some cases, hydrophilic silica having a good dispersibility in water is particularly preferred. Although hydrophobic silica has higher effects for improving fluidity of the sodium hydrogencarbonate than hydrophilic silica, in an absorption tower of a stack gas desulfurizer in a boiler, for example, hydrophobic silica may coagulate on the surface of the existing water to form a layer thereon, and the layer may cause foaming. As silica has hydrophilicity when it is not subjected to a hydrophobic treatment, particularly fumed silica having no hydrophobic treatment applied thereto can be suitably used as the anti-caking agent in this case.

On the other hand, in the case of treating the gas dryly, there will be no above-mentioned problem even if hydrophobic silica is contained as the anti-caking agent. Further, since the content of hydrophobic silica floating on water after the exhaust gas treatment is small, when the acid component-removing agent containing hydrophobic silica is used for e.g. the exhaust gas treatment in a refuse incineration plant, the resulting dust can be treated by dissolving in water. In such a case, the floating components can be removed by e.g. filtration.

Now, the present invention will be described in further detail with reference to examples. However, it should be understood that the present invention is by no means restricted to such specific Examples.

EXAMPLE 1

Sodium hydrogencarbonate having a mean particle diameter of 92 μm (manufactured by Asahi Glass Company Ltd., the same applies hereinafter) was ground by means of an impact grinder equipped with an air classifier (ACM Pulverizer model ACM10A, manufactured by HOSOKAWA MICRON CORP.), while classifying the sodium hydrogencarbonate discharged from the grinder, and returning large particles to the grinder again, to obtain sodium hydrogencarbonate having a mean particle diameter of 9 μm. By this grinder, 150 kg of the sodium hydrogencarbonate was ground to have the above-mentioned average particle size in 1 hour, and no removal of large particles by sieving was employed.

EXAMPLE 2

Comparative Example 500 kg of sodium hydrogencarbonate having a mean particle diameter of 92 μm was subjected to fine grinding for 1 hour by a high speed rotary pin mill (Jiyu mill model M-5, manufactured by Nara Machinery Co., Ltd.) for grinding by impulse and repulsion between a pin attached to a disk rotating at a high speed and a pin attached to a fixed disk, and large particles were removed by a sieve with a sieve opening of 180 μm, to obtain sodium hydrogencarbonate having a mean particle diameter of 38 μm. The yield was 83%. Although the large particles may be returned to the grinder to carry out grinding again, the process will be complicated as compared with the grinder in Example 1. Further, for industrial classification of a large amount of particles by using a sieve, the lower limit of the particle size is substantially about 45 μm, and sodium hydrogencarbonate having a particle size of at most 9 μm can hardly be obtainable.

EXAMPLE 3

Comparative Example 1,000 kg of sodium hydrogencarbonate having a mean particle diameter of 92 μm was subjected to fine grinding for 1 hour by a high speed rotary hammer mill (Atomizer model C-20, manufactured by Fuji Paudal Co., Ltd.) for grinding by a hammer rotating at a high speed, and large particles were removed by a sieve with a sieve opening of 100 μm, to obtain sodium hydrogencarbonate having a mean particle diameter of 28 μm. The yield was 8%.

EXAMPLE 4

6 kg of sodium hydrogencarbonate having a mean particle diameter of 92 μm was subjected to fine grinding for 1 hour by a jet mill (Single Track Jet Mill model STJ-200, manufactured by Seishin Kogyo), to obtain sodium hydrogencarbonate having a mean particle diameter of 4 μm.

No removal of large particles by sieving was required, and almost the entire amount could be obtained as a product.

EXAMPLE 5

Sodium hydrogencarbonate having a mean particle diameter of 92 μm was subjected to wet grinding by using an alumina ball mill. The ball mill was a bench ball mill having an internal volume of 866 cm$^3$, and 430 cm$^3$ or 782 g by mass of alumina balls having diameters of from 10 to 15 mm were put therein. 60 g of the above-mentioned sodium hydrogencarbonate and 200 g of ethanol were put therein, and operation was carried out at 100 rpm for 24 hours, to obtain a slurry of a fine powder of sodium hydrogencarbonate. The obtained slurry of sodium hydrogencarbonate was thinly put in a stainless steel vat, followed by ventilation drying by an explosion-proof dryer of 40° C. for 5 hours, to obtain sodium hydrogencarbonate having a mean particle diameter of 8 μm.

EXAMPLE 6

180 g of sodium hydrogencarbonate having a mean diameter of 92 μm was dispersed in 600 g of $C_4F_9OCH_3$, followed by wet grinding by using an agitator bead mill to obtain a slurry of a fine powder of sodium hydrogencarbonate. The agitator bead mill had an internal volume of 1,400 cm$^3$, was made of zirconia, and had 1,120 cm$^3$ as apparent volume of zirconia beads having a mean diameter of 0.65 mm put therein. The pulverization was carried out at 2,500 rpm for 20 minutes. The slurry of sodium hydrogencarbonate was thinly put in a stainless steel vat, followed by ventilation drying in a dryer of 40° C. for 5 hours, to obtain sodium hydrogencarbonate having a mean particle diameter of 1.5 μm.

EXAMPLE 7

Comparative Example

A slurry of sodium hydrogencarbonate was obtained in the same manner as in Example 6 except that zirconia beads having a mean diameter of 0.3 mm was used, and grinding was carried out for 30 minutes. Drying was carried out in the same manner as in Example 6, to obtain sodium hydrogencarbonate having a mean particle diameter of 0.5 μm.

Measurement of Pore Size Distribution

A pore distribution in the powder bed of the sodium hydrogencarbonate having a mean particle diameter of 9 μm, obtained in Example 1, was measured by using a mercury penetration type pore size measuring apparatus (Micromeritic Poresizer 9310, manufactured by Shimadzu Corp.). The results are shown in Table 1 as represented by the volumes of pores having pore diameters of less than 0.01 μm, from 0.01 to 0.1 μm, from 0.1 to 1 μm, from 1 to 10 μm and over 10 μm. Further, with respect to this sodium hydrogencarbonate, the pore size distribution was measured also by a nitrogen adsorption method. The measurement by the nitrogen adsorption method was carried out by using a pore size distribution measuring apparatus of nitrogen gas adsorption amount measuring type (Bellsoap 28, manufactured by Nippon Bell). The results are shown in Table 1 in the same way.

In Table 1, the volume of pores by mercury method is a volume of pores measured by the mercury penetration method, and the volume of pores by nitrogen method is a volume of pores measured by the nitrogen adsorption method. With respect to the volume of pores by nitrogen method, portions with pore diameters of at least 1 μm can not be measured, and are represented as "-" in Table 1. The same applies to the following Table 2.

TABLE 1

| Pore diameter (μm) | Volume of pores by mercury method (cm$^3$/g) | Volume of pores by nitrogen method (cm$^3$/g) |
| --- | --- | --- |
| Less than 0.01 | 0.014 | 0.004 |
| 0.01–0.1 | 0.010 | 0.007 |
| 0.1–1 | 0.007 | 0 |
| 1–10 | 0.712 | — |
| Over 10 | 0.044 | — |

From Table 1, it was found that most of pores in this sodium hydrogencarbonate had pore diameters of from 1 to 10 μm as measured by the mercury penetration method. It was confirmed that substantially no pore having a pore diameter of less than 0.1 μm was present, from both the volume of pores by mercury method and the volume of pores by nitrogen method.

This sodium hydrogencarbonate was left in a constant temperature dryer of 200° C. for 1 hour for calcination, whereupon sodium carbonate having a mean particle diameter of 9 μm was obtained. With respect to the sodium carbonate, the pore size distribution was measured in the same manner as for the above-mentioned sodium hydrogencarbonate, and the results are shown in Table 2.

TABLE 2

| Pore diameter (μm) | Volume of pores by mercury method (cm$^3$/g) | Volume of pores by nitrogen method (cm$^3$/g) |
| --- | --- | --- |
| Less than 0.01 | 0.016 | 0.006 |
| 0.01–0.1 | 0.014 | 0.026 |
| 0.1–1 | 0.069 | 0.003 |
| 1–10 | 0.789 | — |
| Over 10 | 0.002 | — |

From Table 2, it was found that most of pores in the sodium carbonate also had pore diameters of from 1 to 10 μm. It was confirmed that although a small amount of pores having pore diameters of from 0.1 to 1 μm were present in the sodium carbonate, substantially no pore having a pore diameter of less than 0.1 μm was present, from both the volume of pores by mercury method and the volume of pores by nitrogen method.

Further, with respect to the sodium hydrogencarbonate and the sodium carbonate, the particle shapes were observed by an electron microscope, whereupon the surface of the particles of sodium hydrogencarbonate was smooth, and the surface of the particles of the sodium carbonate had concave portions with inner diameters of at a level of from 1 μm to several μm.

Then, with respect to each of the sodium hydrogencarbonates obtained in Examples 2 to 7, the pore size distribution was measured in the same manner as in Example 1. The volume of pores having pore diameters of from 0.1 to 1 μm as measured by the mercury penetration method and the volume of pores having pore diameters of from 1 to 10 μm as measured by the mercury penetration method, are represented as a pore volume A and a pore volume B, respectively, and the pore volume A and the pore volume B alone are shown in Table 3. In Table 3, Examples including Example 1 are arranged in the order of the mean particle diameter of the sodium hydrogencarbonate so that the smallest comes first. It was confirmed that in the sodium hydrogencarbonates obtained in Examples 2 to 7, substantially no pore having a pore diameter of less than 0.1 μm was present, from both the volume of pores by mercury method and the volume of pores by nitrogen method.

TABLE 3

| Examples | Mean particle diameter (μm) | Pore volume A (cm³/g) | Pore volume B (cm³/g) |
|---|---|---|---|
| 7 | 0.5 | 0.365 | 0.123 |
| 6 | 1.5 | 0.296 | 1.625 |
| 4 | 4 | 0.011 | 1.216 |
| 5 | 8 | 0.007 | 0.801 |
| 1 | 9 | 0.007 | 0.712 |
| 3 | 28 | 0.002 | 0.094 |
| 2 | 38 | 0.006 | 0.024 |

Then, each of the sodium hydrogencarbonates obtained in Examples 2 to 7 was left in a constant temperature dryer at 200° C. in the same manner as in Example 1, and with respect to the obtained sodium carbonate, the pore distribution was measured in the same manner as in Example 1. Among the obtained results, the pore volume A and the pore volume B alone are shown in Table 4. In Table 4, Examples including Example 1 are arranged in order of the mean particle diameter of the sodium carbonate obtained from the sodium hydrogencarbonate so that the smallest comes first. It was confirmed that in the sodium carbonates, substantially no pore having a pore diameter of less than 0.1 μm was present, from both the volume of pores by mercury method and the volume of pores by nitrogen method.

TABLE 4

| Examples | Mean particle diameter (μm) | Pore volume A (cm³/g) | Pore volume B (cm³/g) |
|---|---|---|---|
| 7 | 0.6 | 0.604 | 0.196 |
| 6 | 1.3 | 0.402 | 1.807 |
| 4 | 5 | 0.105 | 1.516 |
| 5 | 8 | 0.116 | 0.986 |
| 1 | 9 | 0.069 | 0.789 |
| 3 | 26 | 0.262 | 0.237 |
| 2 | 35 | 0.204 | 0.147 |

Test for Removal of Acid Components

With respect to each of the sodium hydrogencarbonates after grinding obtained in Examples 1 to 7, performances for absorption of acid components were evaluated as follows. 30 g of the sodium hydrogencarbonate was packed in a fluororesin pipe (inner diameter: 50 mm, length: 100 mm) held lengthwise, and both ends were sealed with glass fiber cloth. The air heated to 200° C. was made to path through the pipe from the lower portion toward the upper portion, through the glass fiber cloth, and before the air past through the glass fiber cloth, a gaseous hydrogen chloride was injected thereto to have a concentration of 600 ppm by volume.

The total amount of the injected hydrogen chloride was twice as much as the theoretical reacting weight of the hydrogen chloride with the sodium carbonate when the entire sodium hydrogencarbonate as the sample was converted to the sodium carbonate. The flow rate of the air was 1 m/s to the section of the sodium hydrogencarbonate packed bed. The sodium carbonate was taken out from the pipe, and the amount of unreacted sodium carbonate was obtained by neutralization titration with 1N hydrochloric acid, to obtain the rate of absorption of hydrogen chloride.

The results are shown in Table 5. In Table 5, Examples are arranged in order of the mean particle diameter of the sodium hydrogencarbonate so that the smallest comes first.

TABLE 5

| Examples | Mean particle diameter (μm) | Rate of reaction (%) |
|---|---|---|
| 7 | 0.6 | 83 |
| 6 | 1.3 | 96 |
| 4 | 5 | 95 |
| 5 | 8 | 92 |
| 1 | 9 | 91 |
| 3 | 26 | 65 |
| 2 | 35 | 53 |

A high removal rate of 91% was achieved with the acid component-removing agent in Example 1, whereas the removal rate was low in Examples 2 and 3. It is estimated that in Examples 2 and 3, as compared with Example 1, pores having pore diameters of from 0.1 to 1.0 μm remained, and pores having pore diameters of from 1 to 10 μm did not adequately develop, whereby diffusion of the hydrogen chloride gas was the rate-determining step, and the rate of absorption of the hydrogen chloride gas was low. Practically, it was confirmed that particles in Examples 2 and 3 had holes of from 0.1 to 1.0 μm on the surfaces in a spongy form, as observed by a scanning electron microscope. Further, the low removal rate of the hydrogen chloride gas in Example 7 is estimated to be attributable to the fact that the acid component-removing agent was in a form of fine particles which were likely to coagulate to one another, whereby ununiformity in the packed structure formed at the packing of the pipe, and accordingly the hydrogen chloride gas short passed in the sodium hydrogencarbonated packed bed.

EXAMPLE 8

To the sodium hydrogencarbonate subjected to fine grinding in Example 1, hydrophobic fumed silica having a mean particle diameter of 0.01 μm (Leoroseal MT-10, manufactured by Tokuyama Corp.) as an anti-caking agent, was added with an amount of 1.0% by mass based on the total amount of the mixture, followed by mixing. Evaluation was carried out by a hang type powder bed cohesion measuring apparatus (Cohetester, manufactured by HOSOKAWA MICRON CORP.) using a two-piece cell.

Namely, the sample was packed into a two-piece cell comprising two cylinders (inner diameter: 50 mm, height: 20 mm) bonded to each other at the bases, and pressure was applied thereto with a pre-compaction load of $8.8 \times 10^3$ Pa, to compress the powder beds. One cylinder of the cell was stretched in a direction perpendicular to the axes of the cylinder at a rate of 2 mm/min., shear stress was applied to the powder bed at the base, and the tensile strength at break of the powder bed was measured. The sodium hydrogencarbonate having the anti-caking agent added thereto had a tensile strength of $0.9 \times 10^2$ Pa, whereas the sodium hydrogencarbonate having no anti-caking agent added thereto had a tensile strength of $4.3 \times 10^2$ Pa. The tensile strengths at break as measured in the same manner with different addition amounts of the anti-caking agent, are shown in Table 6 by the unit of Pa.

As the anti-caking agent, white carbon having a mean particle diameter of 11.8 μm (Tokusil GU-N, manufactured by Tokuyama Corp.) and a basic magnesium carbonate having a mean particle diameter of 9.6 μm (manufactured by Asahi Glass Co., Ltd.) were used, and the tensile strengths at break of the powder bed were measured in the same manner, and the results are shown in Table 6. It is evident that addition of the fumed silica was most effective.

TABLE 6

| Anti-caking | Addition amount (mass %) | | |
|---|---|---|---|
| agent | 0.5 | 1.0 | 2.0 |
| Fumed silica | $2.5 \times 10^2$ | $0.9 \times 10^2$ | $0.7 \times 10^2$ |
| White carbon | $3.9 \times 10^2$ | $3.4 \times 10^2$ | $2.4 \times 10^2$ |
| Basic magnesium carbonate | $3.7 \times 10^2$ | $2.8 \times 10^2$ | $2.3 \times 10^2$ |

Further, 500 kg of each of the sodium hydrogencarbonates was packed in a flexible container, and the conditions after 60 days were observed, whereupon no coagulation was observed with respect to the sodium hydrogencarbonates having 1% by mass of fumed silica added thereto. On the other hand, fist-sized coagulated portions were observed with respect to the sodium hydrogencarbonates having no fumed silica added thereto.

EXAMPLE 9

The sodium hydrogencarbonate having a mean particle diameter of 8 $\mu$m and the sodium hydrogencarbonate having a mean particle diameter of 92 $\mu$m of Example 5 were mixed with a ratio as shown in Table 7, and the tensile strength at break of the powder bed was measured in the same manner as in Example 8. The results are shown in Table 7. Measured by a laser diffraction and scattering particle size analyzer, both mixtures have two peaks, one is in the range from 1 to 9 $\mu$m and another is in the range from 50 to 200 $\mu$m. The determination of an amount of passing a sieve which mesh size is 45 $\mu$m is performed as below.

Employing a ro-tap shaker and five sieves which inside diameters are 200 mm and each mesh size is 250 $\mu$m, 150 $\mu$m, 105 $\mu$m, 75 $\mu$m and 45 $\mu$m. and these sieves are superposed in order of mesh size so that the largest mesh size comes top, 100 g sodium hydrogencarbonate is loaded the top sieve which mesh size is 250 $\mu$m, then shaked 15 minutes. With that the mass based particle size distribution is measured. By means of this particle size distribution, an amount of passing a sieve which mesh size is 45 $\mu$m is calculated.

TABLE 7

| Content (mass %) | | An amount of passing a sieve which mesh size is 45 $\mu$m | Tensile strength (Pa) |
|---|---|---|---|
| 8 $\mu$m | 92 $\mu$m | | |
| 85 | 15 | 17 | $1.1 \times 10^2$ |
| 75 | 25 | 24 | $0.9 \times 10^2$ |

EXAMPLE 10

In order to confirm effects for removing a $SO_3$ component in a gas by addition of the sodium hydrogencarbonate, a test was carried out by using an exhaust gas formed by combustion of fuel in a boiler. Specifically, an exhaust gas was treated in the following process, and to a flue between an air preheater and a desulfurizer, a mixture comprising the sodium hydrogencarbonate having a mean particle diameter of 9 $\mu$m obtained in Example 1, in an amount as shown in Table 8, and hydrophilic fumed silica having a mean particle diameter of 0.01 $\mu$m (Leoroseal QS-102, manufactured by Tokuyama Corp.) in an amount of 1.0 mass % based on the sodium hydrogencarbonate, was added with stirring by the air. Then, a streamer of white smoke (including violet smoke) due to a sulfuric acid mist discharged from a smokestack was visually observed, and evaluation was carried out. In Table 8 is shown Comparative Example wherein no sodium hydrogencarbonate powder was added.

In Table 8, the addition amount of the sodium hydrogencarbonate was represented by the equivalent ratio to $SO_3$ contained in the exhaust gas before it was transported to the desulfurizer (before it contacted with water vapor to form the sulfuric acid mist). The temperature of the gas in the flue between the air preheater and the desulfurizer was 158° C.

PROCESS: an exhaust gas having a high temperature combusted in the boiler was transported to the air preheater through the flue, to carry out heat exchange with the air for combustion, and the exhaust gas was transported to the desulfurizer through the next flue, to remove e.g. $SO_2$ by means of a magnesium hydroxide slurry, and the exhaust gas was transported to the smokestack through the next flue, and discharged from the smokestack.

The boiler to be used and the composition of the exhaust gas were as follows.
Boiler
Model: forced-reflux benson boiler, amount of evaporation: 83 t/h, vapor temperature: 520° C., vapor pressure: 13.7 MPa.
Composition of Exhaust Gas (Volume Ratio)
$O_2$: 4.5%, $SO_2$: 1,400 ppm, $SO_3$: 20 ppm.

TABLE 8

| Amount of sodium hydrogencarbonate | Conditions of white smoke by visual observation |
|---|---|
| Not added | Streamer of about 300 m |
| 1 equivalent amount | Streamer of about 150 m of white smoke with a half concentration or less based on the case where no sodium hydrogencarbonate was added |
| 2 equivalent amount | Streamer of about 10 m as confirmed by careful observation |
| 4 equivalent amount | No streamer |

EXAMPLE 11

Comparative Example

The test was carried out in the same manner as in Example 10 except that sodium hydrogencarbonate having a mean particle diameter of 26 $\mu$m was used instead of the sodium hydrogencarbonate having a mean particle diameter of 9 $\mu$m. The results are shown in Table 9.

TABLE 9

| Amount of sodium hydrogencarbonate | Conditions of white smoke by visual observation |
|---|---|
| Not added | Streamer of about 300 m |
| 1 equivalent amount | Streamer of about 300 m of white smoke with a concentration of 60–70% based on the case where no sodium hydrogencarbonate was added |
| 4 equivalent amount | Streamer of about 200 m of white smoke with a half |

TABLE 9-continued concentration, or less
based on the case where no
sodium hydrogencarbonate
was added The acid component-removing agent of the present invention can be effectively used industrially for removing acid components, particularly a hydrogen chloride component and a $SO_3$ component, in an exhaust gas. In the present invention, the reactivity of the acid component-removing agent with hydrogen chloride gas or the $SO_3$ component is excellent, and accordingly the hydrogen chloride gas or the $SO_3$ component can be adequately removed by adsorption with a small amount of the acid component-removing agent. Further, sodium chloride as a reaction product or unreacted sodium carbonate is soluble in water, whereby dust after removal of the acid components in the exhaust gas can be separated and removed from sodium chloride, by dissolving the dust in water so that heavy metals are selectively deposited as hydroxides, sulfides or carbonates, or by ion-exchange. Accordingly, the amount of waste can significantly be reduced.

Namely, the acid component-removing agent of the present invention can effectively remove acid components in an exhaust gas discharged from e.g. a refuse incineration plant, particularly hydrogen chloride or a $SO_3$ component contained in a combustion exhaust gas from e.g. a boiler, and reduce burned residue or violet smoke gas to be generated, and it can significantly reduce load on environment.

What is claimed is:

1. An acid component-removing agent which comprises sodium hydrogencarbonate having a volume-based mean particle diameter of from 1 to 9 μm as measured by a laser diffraction and scattering method, wherein the sodium hydrogencarbonate has a pore distribution as measured by a mercury penetration method, in which the volume of pores having pore diameters within a range of from 1 to 10 μm is at least 0.4 cm³/g.

2. The acid component-removing agent according to claim 1, which contains an anti-caking agent.

3. The acid component-removing agent according to claim 2, wherein the anti-caking agent is silica.

4. The acid component-removing agent according to claim 2, wherein the anti-caking agent is contained in an amount of from 0.1 to 5 mass % based on the sodium hydrogencarbonate.

5. The acid component-removing agent according to claim 2, wherein the anti-caking agent is fine particles having a mean particle diameter of from 0.005 to 0.1 μm.

6. A method for producing the acid component-removing agent of claim 1 which comprises grinding sodium hydrogencarbonate by means of an impact type grinder equipped with an air classifier, while classifying particles discharged from the grinder and returning large particles to the grinder.

7. A method for producing the acid component-removing agent of claim 1 which comprises grinding sodium hydrogencarbonate by a jet mill.

8. A method for producing an acid component-removing agent of claim 1 comprising sodium hydrogencarbonate with a volume-based mean particle diameter of from 1 to 9 μm as measured by a laser diffraction and scattering method, which comprises dispersing sodium hydrogencarbonate in a liquid dissolving substantially no sodium hydrogencarbonate to obtain a slurry, subjecting said slurry to wet grinding by an agitator bead mill or a ball mill, and separating the resulting sodium hydrogencarbonate, followed by drying.

9. A method of removing acid components in an exhaust gas in a refuse incineration plant, which comprises adding to the exhaust gas the acid component-removing agent of claim 1 and hydrophobic silica as an anti-caking agent.

10. A method for removing acid components in a gas, which comprises dispersing the acid component-removing agent of claim 1 in a gas to be treated, followed by collection of the acid component-removing agent by a bag filter.

11. The method of claim 10, wherein the gas comprises an acid component selected from the group consisting of hydrogen chloride, $SO_3$, and mixtures thereof.

12. A method for removing acid components in a gas, which comprises adding the acid component-removing agent of claim 1, wherein the gas has a temperature of at least 60° C. and the gas comprises a $SO_3$ component, whereby the acid component-removing agent removes the $SO_3$ component in the gas.

13. The method for removing acid components in a gas according to claim 12, wherein the acid component-removing agent contains an anti-caking agent.

14. The method for removing acid components in a gas according to claim 13, wherein the anti-caking agent is silica.

15. The method for removing acid components in a gas according to claim 14, wherein the anti-caking agent is hydrophilic silica.

16. An acid component-removing agent which comprises sodium hydrogencarbonate having two peaks within ranges of from 1 to 9 μm and from 50 to 200 μm in a volume-based particle size distribution as measured by a laser diffraction and scattering method, and having a mass of particles with particle sizes exceeding 45 μm of from 10 to 30% based on the total mass as measured by sieving method.

17. An acid component-removing agent comprising sodium carbonate having a pore distribution as measured by a mercury penetration method, wherein the volume of pores of said sodium carbonate having pore diameters within a range of from 1 to 10 μm is at least 0.4 cm³/g.

18. The acid component-removing agent of claim 17, wherein the sodium carbonate is prepared by calcining at 200° C. for 1 hour a sodium hydrogencarbonate having a volume-base mean particle diameter of from 1 to 9 μm as measured by a laser diffraction and scattering method, and a pore distribution as measured by a mercury penetration method in which the volume of pores of the sodium hydrogencarbonate having pore diameters within a range of from 1 to 10 μm is at least 0.4 cm³/g.

* * * * *